United States Patent
Iwamura et al.

(10) Patent No.: US 9,544,106 B2
(45) Date of Patent: Jan. 10, 2017

(54) MOBILE COMMUNICATION METHOD AND RADIO BASE STATION

(75) Inventors: Mikio Iwamura, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 112 days.

(21) Appl. No.: 14/118,299

(22) PCT Filed: May 10, 2012

(86) PCT No.: PCT/JP2012/061941
§ 371 (c)(1),
(2), (4) Date: Jan. 8, 2014

(87) PCT Pub. No.: WO2012/157499
PCT Pub. Date: Nov. 22, 2012

(65) Prior Publication Data
US 2014/0204852 A1    Jul. 24, 2014

(30) Foreign Application Priority Data
May 18, 2011  (JP) .................................. 2011-111921

(51) Int. Cl.
*H04L 5/00* (2006.01)
*H04W 72/04* (2009.01)

(52) U.S. Cl.
CPC ........ *H04L 5/0037* (2013.01); *H04W 72/0406* (2013.01)

(58) Field of Classification Search
CPC ........ H04L 5/0037; H04L 5/003; H04L 12/52; H04W 72/0406; H04W 76/02; H04W 76/046

(Continued)

(56) References Cited

U.S. PATENT DOCUMENTS 8,913,511 B2 * 12/2014 Geirhofer ............. H04W 52/08
370/252
2007/0058605 A1    3/2007 Meylan et al.
(Continued)

FOREIGN PATENT DOCUMENTS

EP    1389884 A1    2/2004
JP    9-502059 A    2/1997
(Continued)

OTHER PUBLICATIONS

Office Action Issued in Corresponding European Application No. 12786525.1, Dated May 25, 2016 (4 Pages).
(Continued)

*Primary Examiner* — Kwang B Yao
*Assistant Examiner* — Syed M Bokhari
(74) *Attorney, Agent, or Firm* — Osha Liang LLP (57) ABSTRACT

Transmission/reception timing of a data signal and a control signal through a Uu interface and transmission/reception timing of the data signal through a Ud interface are properly adjusted. A mobile communication method according to the present invention includes: a step A in which a radio base station eNB notifies a mobile station UE#1 and a mobile station UE#2 that an opportunity to transmit and receive the data signal through the Ud interface is allocated through a PDCCH in which an X-RNTI is used; and a step B in which the radio base station eNB transmit "direction information", for notifying of a direction in which the data signal should be transmitted in the opportunity, to the mobile station UE#1 and the mobile station UE#2.

8 Claims, 6 Drawing Sheets (58) Field of Classification Search
USPC .................. 370/329, 336, 252, 450, 311
See application file for complete search history.

(56) References Cited

U.S. PATENT DOCUMENTS

| | | | |
|---|---|---|---|
| 2008/0101268 A1* | 5/2008 | Sammour | H04W 76/048 370/311 |
| 2012/0122463 A1* | 5/2012 | Chen | H04W 72/082 455/450 |
| 2012/0129540 A1* | 5/2012 | Hakola | H04W 72/042 455/450 |
| 2012/0201158 A1* | 8/2012 | Geirhofer | H04W 52/383 370/252 |
| 2012/0281679 A1* | 11/2012 | Fan | H04W 74/008 370/336 |

FOREIGN PATENT DOCUMENTS

| | | |
|---|---|---|
| JP | 2004-165881 A | 6/2004 |
| JP | 2007-501582 A | 1/2007 |
| JP | 2008-532346 A | 8/2008 |
| JP | 2009-508448 A | 2/2009 |
| WO | 95/06395 A1 | 3/1995 |
| WO | 2004/102833 A1 | 11/2004 |
| WO | 2006/081123 A2 | 8/2006 |
| WO | 2007/033263 A1 | 3/2007 |
| WO | 2010/078273 A2 | 7/2010 |

OTHER PUBLICATIONS

Search Report issued in corresponding European Application No. 12786525.1, mailed Oct. 1, 2014 (7 pages).
International Search Report for corresponding International Application No. PCT/JP2012/061941, mailed Jul. 31, 2012 (4 pages).
Office Action for corresponding Japanese Application No. 2011-111921, mailed Jun. 25, 2013 (6 pages).
3GPP TS 36.213 V10.1.0; "3rd Generation Partnership Project; Technical Specification Group Radio Access Network; Evolved Universal Terrestrial Radio Access (E-UTRA); Physical layer procedures (Release 10);" Mar. 2011 (68 pages).
3GPP TS 36.323 V10.1.0; "3rd Generation Partnership Project; Technical Specification Group Radio Access Network; Evolved Unviersal Terrestrial Radio Access (E-UTRA); Packet Data Convergence Protocol (PDCP) specification (Release 10);" Mar. 2011 (26 pages).
3GPP TS 36.300 V10.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10);" Mar. 2011 (197 pages).

* cited by examiner

MOBILE COMMUNICATION METHOD AND RADIO BASE STATION

TECHNICAL FIELD

The present invention relates to a mobile communication method and a radio base station.

BACKGROUND ART

Figure 7:
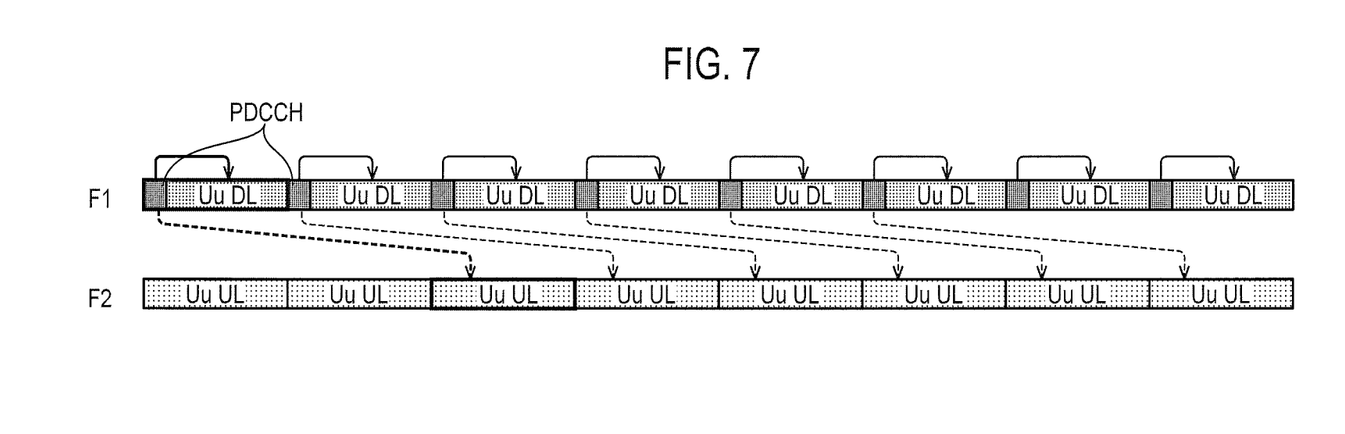
FIG. 7 is a view explaining a conventional mobile communication system.

FIG. 7 illustrates transmission/reception timing in a Uu interface (radio base station interface) of a conventional LTE (Long Term Evolution) system.

In an example in FIG. 7, at a frequency F1, a mobile station UE is configured to receive a control signal through a PDCCH (Physical Downlink Control Channel), and to receive a data signal through a PDSCH (Physical Downlink Shared Channel).

The mobile station UE is also configured to transmit the data signal through a PUSCH (Physical Uplink Shared Channel) at a frequency F2.

A radio base station eNB is configured to transmit a "DL resource allocation" notifying of an allocation of an opportunity (Uu DL) to receive the data signal through the Uu interface (PDSCH) and a "UL grant" notifying of an allocation of an opportunity (Uu UL) to transmit the data signal through the Uu interface (PUSCH) through the PDCCH.

The "Uu DL" is allocated on a subframe identical to the PDCCH.

On the other hand, the subframe to which the "Uu UL" is allocated is determined in consideration of a processing delay until the data signal (transport block) is generated from the time when the "UL grant" is received through the PDCCH in the mobile station UE.

For example, the "Uu UL" is configured to be allocated to the subframe located behind the subframe, to which the PDCCH is allocated, by X subframes.

CITATION LIST

Non-Patent Literature

Non-Patent Literature 1: 3GPP TS36.300
Non-Patent Literature 2: 3GPP TS36.323
Non-Patent Literature 3: 3GPP TS36.213

SUMMARY OF INVENTION

In the future, in the LTE mobile communication system, there is a possibility that a mobile station UE#1 and a mobile station UE#2 that are in an "RRC_Connected state" in a cell under control of the identical radio base station eNB can perform the transmission/reception of the data signal through the Ud interface (inter-mobile station interface) that is directly set between the mobile station UE#1 and the mobile station UE#2 in addition to the transmission/reception of the data signal and the control signal between the mobile station UE#1 and the mobile station UE#2 and the radio base station eNB through the Uu interface.

However, in such cases, the mobile station UE#1 and the mobile station UE#2 cannot simultaneously perform the transmission/reception of the data signal and the control signal through the Uu interface and the transmission/reception of the data signal through the Ud interface at an identical frequency. Therefore, it is inevitable to adjust transmission/reception timing of the data signal and the control signal through the Uu interface and transmission/reception timing of the data signal through the Ud interface.

The present invention has been devised to solve the above problems, and an object thereof is to provide a mobile communication method and a radio base station, which can properly adjust the transmission/reception timing of the data signal and the control signal through the Uu interface and the transmission/reception timing of the data signal through the Ud interface.

In accordance with a first aspect of the present invention, a mobile communication method for transmitting and receiving a data signal and a control signal through a radio base station interface between a first mobile station and a second mobile station and a radio base station, and for transmitting and receiving the data signal through an inter-mobile station interface between the first mobile station and the second mobile station, the mobile communication method includes: a step A in which the radio base station notifies the first mobile station and the second mobile station that an opportunity to transmit and receive the data signal through the inter-mobile station interface is allocated through a physical downlink control channel in which common identification information is used; and a step B in which the radio base station transmits transmission direction information, for notifying of a direction in which the data signal should be transmitted in the opportunity, to the first mobile station and the second mobile station.

In accordance with a second aspect of the present invention, a radio base station that is used in a mobile communication system configured to be able to transmit and receive a data signal and a control signal through a radio base station interface between a first mobile station and a second mobile station and a radio base station, and to transmit and receive the data signal through an inter-mobile station interface between the first mobile station and the second mobile station, the radio base station including a transmission unit configured to notify the first mobile station and the second mobile station that an opportunity to transmit and receive the data signal through the inter-mobile station interface is allocated through a physical downlink control channel in which common identification information is used, wherein the transmission unit is configured to transmit transmission direction information, for notifying of a direction in which the data signal should be transmitted in the opportunity to the first mobile station and the second mobile station.

DESCRIPTION OF EMBODIMENTS (Mobile Communication System According to a First Embodiment of the Present Invention)

A mobile communication system according to the first embodiment of the present invention will be described with reference to FIGS. 1 to 6.

Figure 1:
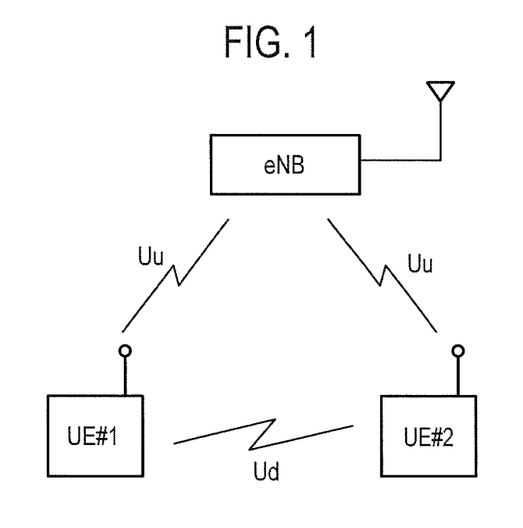
FIG. 1 is an entire configuration diagram of a mobile communication system according to a first embodiment of the present invention.

The mobile communication system of the embodiment is an LTE mobile communication system, and includes a core network (not illustrated) and a radio base station eNB connected to the core network as illustrated in FIG. 1. The present invention can also be applied to a cellular mobile communication system in addition to the LTE mobile communication system.

As illustrated in FIG. 1, a mobile station UE#1 is configured to transmit and receive a data signal and a control signal to and from the radio base station eNB through a Uu interface, and to transmit and receive the data signal to and from a mobile station UE#2 through a Ud interface.

Similarly, the mobile station UE#2 is configured to transmit and receive the data signal and the control signal to and from the radio base station eNB through the Uu interface, and to transmit and receive the data signal to and from the mobile station UE#1 through the Ud interface.

Figure 2:
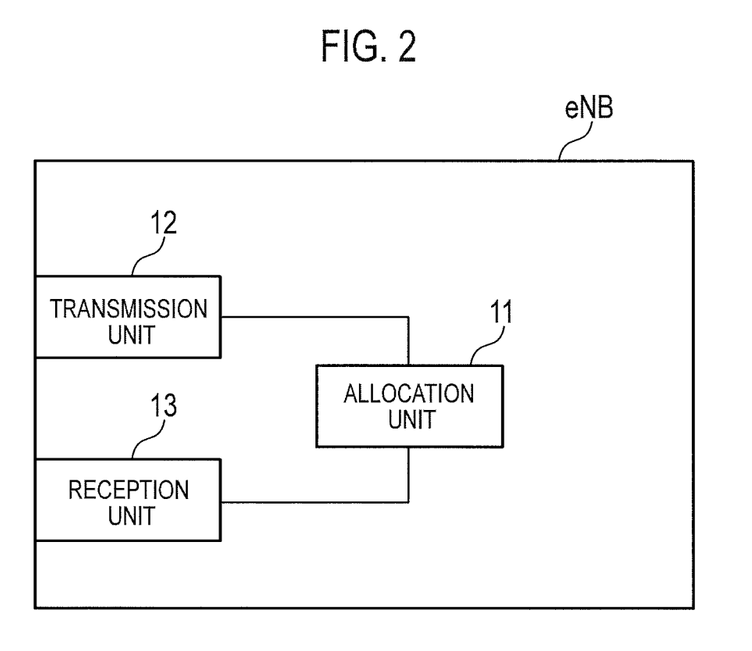
FIG. 2 is a functional block diagram of a radio base station according to the first embodiment of the present invention.

As illustrated in FIG. 2, the radio base station eNB includes an allocation unit 11, a transmission unit 12, and a reception unit 13.

The allocation unit 11 is configured to allocate an opportunity transmit and receive the data signal to and from the mobile station UE#1 and the mobile station UE#2 through the Uu interface or an opportunity to transmit and receive the data signal to and from the mobile station UE#1 and the mobile station UE#2 through the Ud interface.

The transmission unit 12 is configured to transmit the data signal and the control signal to the mobile station UE#1 and the mobile station UE#2 through the Uu interface.

For example, the transmission unit 12 is configured to transmit a "DL resource allocation" to the mobile station UE#1 and the mobile station UE#2 through a PDCCH in which identification information (C-RNTI: Cell-Radio Network Temporary Identity) is used, and the transmission unit 12 is configured to transmit a "UL grant" to the mobile station UE#1 and the mobile station UE#2 through the Uu interface (PUSCH). The "DL resource allocation" notifies the mobile station UE#1 and the mobile station UE#2 that the opportunity (Uu DL) to receive the data signal through the Uu interface (PDSCH) is allocated to the control signal. The "UL grant" notifies the mobile station UE#1 and the mobile station UE#2 that the opportunity (Uu UL) to transmit the data signal through the Uu interface (PUSCH).

The transmission unit 12 is configured to notify the mobile station UE#1 and the mobile station UE#2 that the opportunity (Ud Tx) to transmit the data signal through the Ud interface is allocated through the PDCCH in which common identification information (hereinafter referred to as an X-RNTI) on the mobile station UE#1 and the mobile station UE#2 is used, and to notify the mobile station UE#1 and the mobile station UE#2 that the opportunity (Ud Rx) to receive the data signal through the Ud interface is allocated.

At this point, in making the notification that the "Ud Tx" and the "Ud Rx" are allocated, the use of the X-RNTI common to the mobile station UE#1 and the mobile station UE#2 can reduce a signaling amount related to the PDCCH compared with the case where a C-RNTI is used in each of the mobile station UE#1 and the mobile station UE#2.

The transmission unit 12 may be configured to previously allocate the X-RNTI to the mobile station UE#1 and the mobile station UE#2 through RRC signaling. The mobile station UE#1 and the mobile station UE#2 may be notified of the X-RNTI during a setting of the Ud interface.

The transmission unit 12 is also configured to transmit the data signal to the mobile station UE#1 and the mobile station UE#2 through the PDSCH in the opportunity allocated by the allocation unit 11.

Therefore, each of the mobile station UE#1 and the mobile station UE#2 performs "blind decode" to the PDCCH that is transmitted using the X-RNTI while performing the "blind decode" to the PDCCH that is transmitted using the C-RNTI of itself.

The reception unit 13 is configured to receive the data signal and the control signal from the mobile station UE#1 and the mobile station UE#2 through the Uu interface.

For example, the transmission unit 12 is configured to receive the data signal from the mobile station UE#1 and the mobile station UE#2 through the PUSCH in the opportunity allocated by the allocation unit 11.

In the mobile communication system of the embodiment, the following four cases are considered by a combination of a frequency used in the transmission/reception through the Uu interface and a frequency used in the transmission/reception through the Ud interface.

The case where the frequency used in the transmission/reception through the Ud interface is the same as the frequency used in the transmission/reception of an uplink through the Uu interface (case 1)

The case where the frequency used in the transmission/reception through the Ud interface is to the same as the frequency used in the transmission/reception of a downlink through the Uu interface (case 2)

The case where the frequency used in the transmission/reception through the Ud interface is different from the frequency used in the transmission/reception through the Uu interface while the frequency used in the transmission/reception through the Ud interface is to the same as the frequency used in the transmission of the mobile station UE#2 through the Ud interface (case 3)

The case where the frequency used in the transmission/reception through the Ud interface is different from the frequency used in the transmission/reception through the Uu interface while the frequency used in the transmission of the mobile station UE#1 through the Ud interface is different from the frequency used in the transmission of the mobile station UE#2 through the Ud interface (case 4)

The transmission/reception timing through the Uu interface and the transmission/reception timing Uu interface Ud interface in the cases 1 to 4 will be described with reference to FIGS. 3 to 6.

In examples in FIGS. 3 to 6, a head position of each subframe at a frequency F1 and a head position of each subframe at a frequency F2 are identical to each other (when viewed from the radio base station eNB). However, the present invention can also be applied to the case where the head positions of each subframe at the frequencies F1 and F2 are not identical to each other.

<Case 1>

Figure 3:
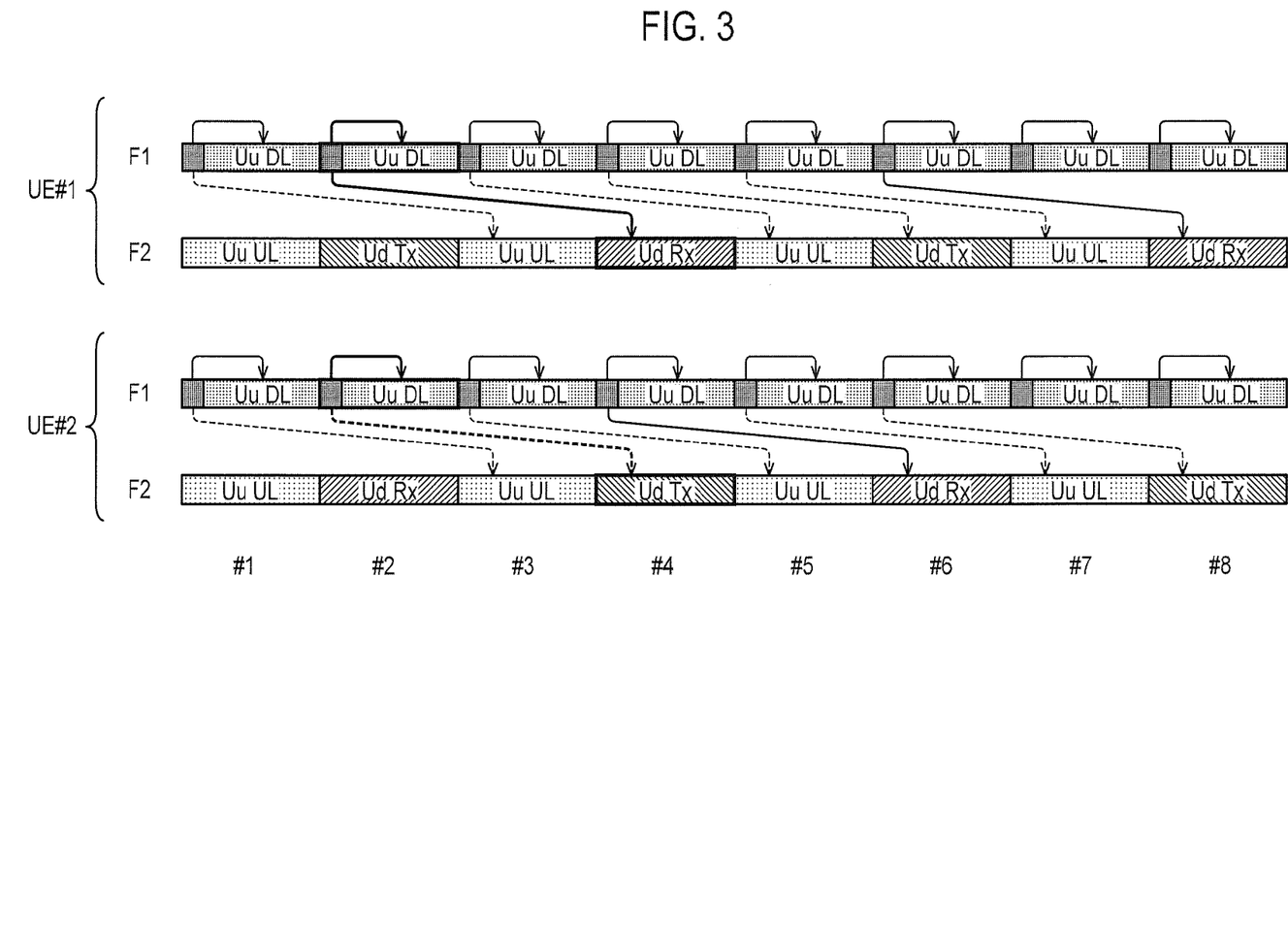
FIG. 3 is a view illustrating transmission/reception timing in the mobile communication system according to the first embodiment of the present invention.

As illustrated in FIG. 3, in the case 1, the transmission/reception through the Ud interface and the transmission/ reception of the uplink through the Uu interface are configured to be performed in a time-division manner at the frequency F2.

As illustrated in FIG. 3, in the case 1, the transmission/reception of the downlink through the Uu interface is configured to be performed at the frequency F1.

Specifically, the allocation unit 11 is configured to perform the allocation similar to that of the conventional LTE system to the opportunity to perform the transmission/reception of the uplink through the Uu interface and the opportunity to perform the transmission/reception of the downlink through the Uu interface.

That is, the allocation unit 11 is configured to allocate the PDSCH (that is, the "Uu DL") to the subframe identical to that of the PDCCH, and to allocate the PUSCH (that is, the "Uu UL") to the subframe that is located behind the subframe, to which the PDCCH is allocated, by X subframes.

On the other hand, the allocation unit 11 is configured to determine the opportunity to perform the transmission/reception through the Ud interface in consideration of a processing delay until the data signal (transport block) is generated in the mobile station UE#1 and the mobile station UE#2.

For example, the allocation unit 11 is configured to allocate the opportunity to perform the transmission/reception through the Ud interface to the subframe that is located behind the subframe, to which the PDCCH is allocated, by Y (X≤Y) subframes.

The transmission unit 12 may be configured to transmit "direction information (for example, UE#1→UE#2 or UE#2→UE#1)", for notifying a direction in which the data signal should be transmitted in the opportunity (subframe) to perform the transmission/reception through the Ud interface, to the mobile station UE#1 and the mobile station UE#2 through the PDCCH.

Alternatively, the transmission unit 12 may be configured to previously transmit and set the "direction information" notifying the mobile station UE#1 and the mobile station UE#2 of the direction in which the data signal should be transmitted in each subframe to the mobile station UE#1 and the mobile station UE#2 through the RRC signaling. In such cases, the transmission unit 12 needs not to include the "direction information" in the PDCCH.

The transmission unit 12 may be configured to transmit time-division information to the mobile station UE#1 and the mobile station UE#2 through the RRC signaling. The time-division information is necessary to perform the transmission/reception through the Uu interface and the transmission/reception through the Ud interface in the time-division manner.

For example, the transmission unit 12 is configured to transmit information, which notifies of the subframe to which the opportunity to perform the transmission/reception through the Uu interface is possibly allocated and the subframe to which the opportunity to perform the transmission/reception through the Ud interface is possibly allocated, as time-division information.

Thus, in the case where the time-division information is previously transmitted through the RRC signaling, the mobile station UE#1 and the mobile station UE#2 may perform the "blind decode" while being limited to a "DL resource allocation" transmitting PDCCH format and a "UL grant" transmitting PDCCH format, in the subframe (for example, subframes #1, #3, and #5) to which the opportunity to perform the transmission/reception through the Uu interface is possibly allocated.

Similarly, in the case where the time-division information is previously transmitted through the RRC signaling, the mobile station UE#1 and the mobile station UE#2 may perform the "blind decode" while being limited to the "DL resource allocation" transmitting PDCCH format, a PDCCH format notifying that the opportunity to perform the transmission/reception (UE#1→UE#2) through the Ud interface is allocated, and a PDCCH format notifying that the opportunity to perform the transmission/reception (UE#2→UE#1) through the Ud interface is allocated, in the subframe (for example, subframes #2, #4, and #6) to which the opportunity to perform the transmission/reception through the Ud interface is possibly allocated.

At this point, the PDCCH format notifying that the opportunity to perform the transmission/reception through the Uu interface is allocated may be configured to be different from the PDCCH format notifying that the opportunity to perform the transmission/reception through the Ud interface is allocated.

In the PDCCH formats, for notifying that the opportunity to perform the transmission/reception through the Uu interface is allocated, the "DL resource allocation" transmitting PDCCH format may be configured to be different from the "UL grant" transmitting PDCCH format.

The PDCCH format notifying that the opportunity to perform the transmission/reception (UE#1→UE#2) through the Ud interface is allocated may be configured to be different from the PDCCH format notifying that the opportunity to perform the transmission/reception (UE#2→UE#1) through the Ud interface is allocated.

As a result, the number of patterns of the "blind decode" performing PDCCH format in the mobile station UE#1 and the mobile station UE#2 can be decreased.

In the case where the "direction information" is previously transmitted through the RRC signaling in addition to the time-division information, the mobile station UE#1 and the mobile station UE#2 may perform the "blind decode" in each subframe while being limited to one of a combination of the "DL resource allocation" transmitting PDCCH format and the "UL grant" transmitting PDCCH format, a combination of the "DL resource allocation" transmitting PDCCH format and the PDCCH format notifying that the opportunity to perform the transmission/reception (UE#1→UE#2) through the Ud interface is allocated, and a combination of "DL resource allocation" transmitting PDCCH format and the PDCCH format notifying that the opportunity to perform the transmission/reception (UE#2→UE#1) through the Ud interface is allocated.

As a result, the number of patterns of the "blind decode" performing PDCCH format in the mobile station UE#1 and the mobile station UE#2 can further be decreased.

In the case where the time-division information is not previously transmitted through the RRC signaling, in each subframe, the mobile station UE#1 and the mobile station UE#2 may perform the "blind decode" to the "DL resource allocation" transmitting PDCCH format, the "UL grant" transmitting PDCCH format, the PDCCH format notifying that the opportunity to perform the transmission/reception (UE#1→UE#2) through the Ud interface is allocated, and the PDCCH format notifying that the opportunity to perform the transmission/reception (UE#2→UE#1) through the Ud interface is allocated.

In such cases, the number of patterns of the "blind decode" performing PDCCH format is increased in the mobile station UE#1 and the mobile station UE#2. However, the subframe to which the opportunity to perform the transmission/reception through the Uu interface is allocated and the subframe to which the opportunity to perform the transmission/reception through the Ud interface is possibly allocated are not previously fixed, so that the radio base station eNB can flexibly allocate the opportunity to perform the transmission/reception through the Uu/Ud interface based on a data signal amount and the like.

In the case 1, it is necessary for the mobile station UE#1 and the mobile station UE#2 to have an ability to perform not only the transmission through the Uu/Ud interface but also the reception through the Ud interface at the frequency F2. That is, the mobile station UE#1 and the mobile station UE#2 need to support a TDD (Time Divisional Duplexing) function at the frequency F2.

<Case 2>

Points different from the operation in the case 1 will mainly be described with reference to FIG. 4.

Figure 4:
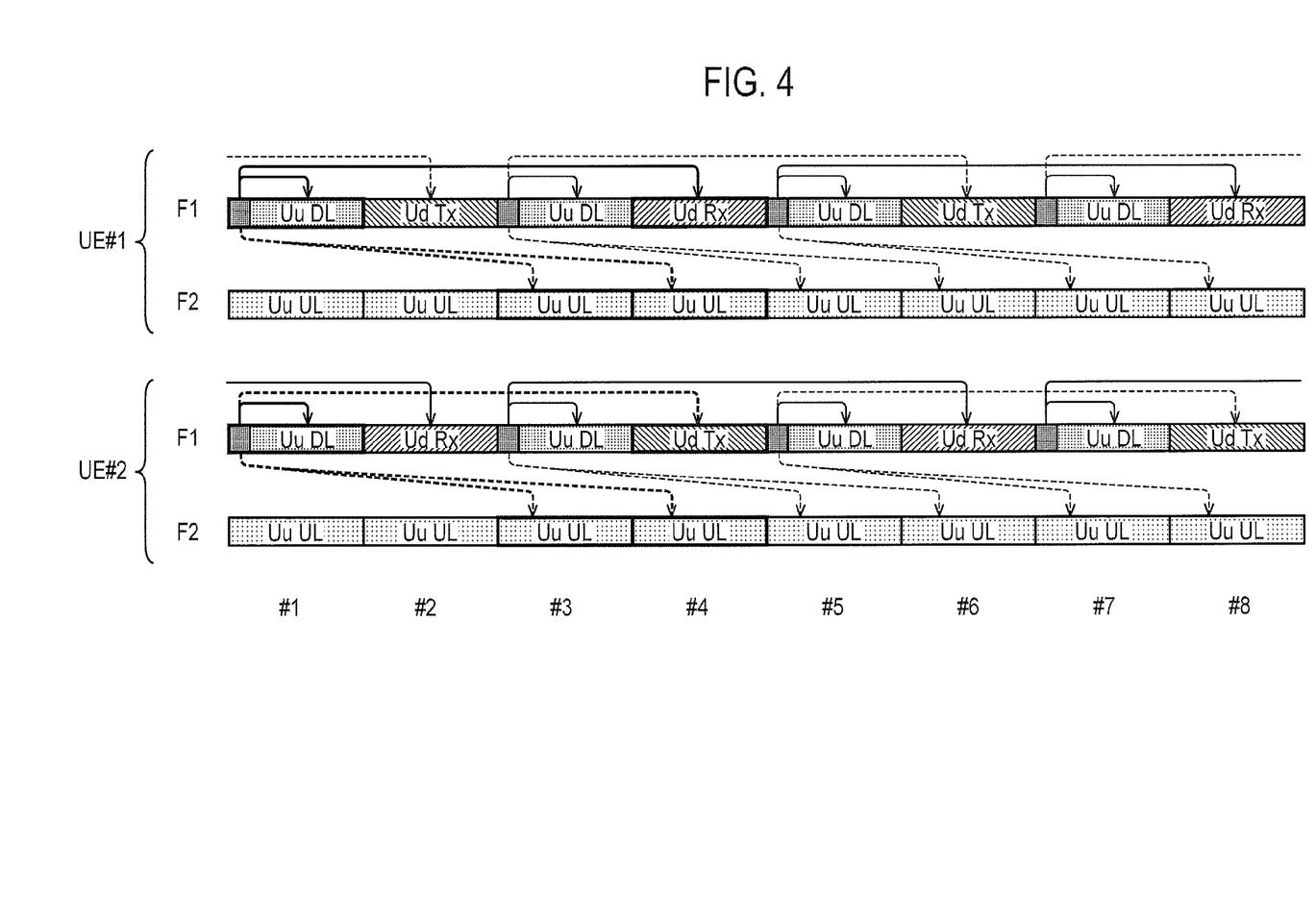
FIG. 4 is a view illustrating the transmission/reception timing in the mobile communication system according to the first embodiment of the present invention.

As illustrated in FIG. 4, in the case 2, the transmission/reception through the Ud interface and the transmission/reception of the downlink through the Uu interface are configured to be performed in the time-division manner at the frequency F1.

As illustrated in FIG. 4, in the case 2, the transmission/reception of the uplink through the Uu interface is configured to be performed at the frequency F2.

Specifically, the allocation unit 11 is configured to perform the allocation similar to that of the conventional LTE system to the opportunity to perform the transmission/reception of the uplink through the Uu interface and the opportunity to perform the transmission/reception of the downlink through the Uu interface.

That is, the allocation unit 11 is configured to allocate the PDSCH (that is, the "Uu DL") to the subframe identical to that of the PDCCH, and to allocate the PUSCH (that is, the "Uu UL") to the subframe that is located behind the subframe, to which the PDCCH is allocated, by X subframes.

However, the allocation unit 11 is configured to allocate the opportunity to perform the transmission/reception of the uplink through the Uu interface to the subframe that is located behind the subframe, to which the PDCCH is allocated, by X1 (X≤X1) subframes.

This is because the subframe (for example, subframes #2, #4, #6, and #8) in which the PDCCH cannot be received in the mobile station UE#1 and the mobile station UE#2 is generated with insertion of the opportunity to perform the transmission/reception through the Ud interface at the frequency F1.

Accordingly, the allocation unit 11 is configured to perform the PUSCH allocation, which should be performed through the PDCCH in the subframe (for example, subframes #2, #4, #6, and #8) in which the PDCCH cannot be received, using the PDCCH in the subframe (for example, subframes #1, #3, #5, and #7) located ahead by one.

On the other hand, the allocation unit 11 is configured to determine the opportunity to perform the transmission/reception through the Ud interface in consideration of the processing delay until the data signal (transport block) is generated in the mobile station UE#1 and the mobile station UE#2.

However, because the subframe (for example, subframes #2, #4, #6, and #8) in which the PDCCH cannot be received in the mobile station UE#1 and the mobile station UE#2 is generated with the insertion of the opportunity to perform the transmission/reception through the Ud interface at the frequency F1, the allocation unit 11 may be configured to allocate the opportunity to perform the transmission/reception of the uplink through the Ud interface to the subframe that is located behind the subframe, to which the PDCCH is allocated, by Y1 (Y≤Y1) subframes.

Thus, in consideration of the generation of the subframe in which the PDCCH cannot be received, the transmission unit 12 may be configured to notify of the subframe in which the transmission/reception of the data signal should be performed through the Ud interface.

For example, the transmission unit 12 may be configured to notify of information ("subframe index") indicating how many subframes the allocation of the opportunity to perform the transmission/reception through the Ud interface is located ahead of the subframe, to which the PDCCH is allocated, using a "code point" in a specific field of the PDCCH.

The transmission unit 12 may be configured to previously notify of mapping of the "code point" and the "subframe index" through the RRC signaling.

Alternatively, in the case where the mobile station UE#1 and the mobile station UE#2 receive the PDCCH, the mobile station UE#1 and the mobile station UE#2 may be configured to initially set the subframe in which the transmission/reception can be performed through the Ud interface to the subframe in which the transmission/reception of the data signal should be performed through the Ud interface, after a time (X ms) corresponding to the processing delay elapses.

In the case 2, it is necessary for the mobile station UE#1 and the mobile station UE#2 to have the ability to perform not only the transmission through the Ud interface but also the reception through the Uu/Ud interface at the frequency F1. That is, the mobile station UE#1 and the mobile station UE#2 need to support the TDD function at the frequency F1.

The mobile station UE#1 and the mobile station UE#2 may be configured to be able to receive the PDCCH even in the subframe in which the mobile station UE#1 and the mobile station UE#2 should perform the transmission/reception of the data signal through the Ud interface.

In such cases, the transmission/reception of the data signal through the Ud interface is performed for a remaining time except reception timing (head 1 to 3 OFDM symbols of the subframe) of the PDCCH. In this case, X1=X and Y1=Y are obtained.

<Case 3>

Points different from the operation in the cases 1 and 2 will mainly be described with reference to FIG. 5.

Figure 5:
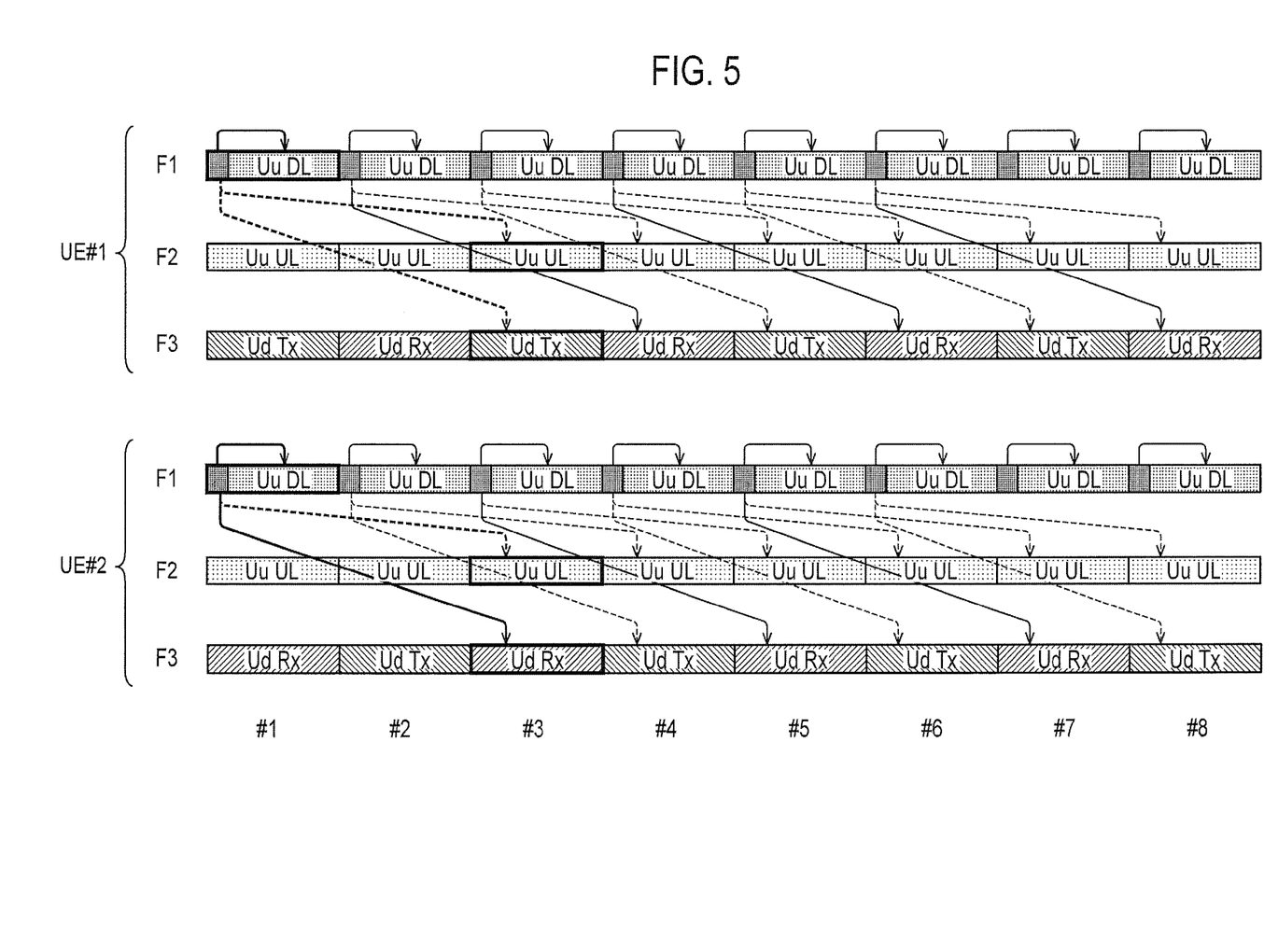
FIG. 5 is a view illustrating the transmission/reception timing in the mobile communication system according to the first embodiment of the present invention.

As illustrated in FIG. 5, in the case 3, the transmission/reception of the downlink through the Ud interface is configured to be performed at the frequency F1, the transmission/reception of the uplink through the Uu interface is configured to be performed at the frequency F2, and the transmission/reception through the Ud interface is configured to be performed at a frequency F3.

The transmission/reception (UE#1→UE#2) through the Ud interface and the transmission/reception (UE#2→UE#1) through the Ud interface are configured to be performed in the time-division manner at the frequency F3.

In the case 3, the operation of the radio base station eNB is similar to that of the case 1 except that the transmission/reception through the Ud interface is performed at the frequency F3.

In consideration of a plurality of frequencies (carriers) for the transmission/reception through the Ud interface, the allocation unit 11 may be configured to notify of information ("carrier index") indicating the frequency at which the transmission/reception should be performed through the Ud interface using the "code point" in the specific field of the PDCCH.

The transmission unit 12 may be configured to previously notify of the mapping of the "code point" and the "carrier index" through the RRC signaling.

The transmission unit 12 may be configured to previously notify of the carrier mapped in each "carrier index" through the RRC signaling.

In the case 3, it is necessary for the mobile station UE#1 and the mobile station UE#2 to have the ability to perform not only the transmission through the Ud interface but also the reception through the Ud interface at the frequency F3. That is, the mobile station UE#1 and the mobile station UE#2 need to support the TDD function at the frequency F3.

<Case 4>

Points different from the operation in the cases 1, 2, and 3 will mainly be described with reference to FIG. 6.

Figure 6:
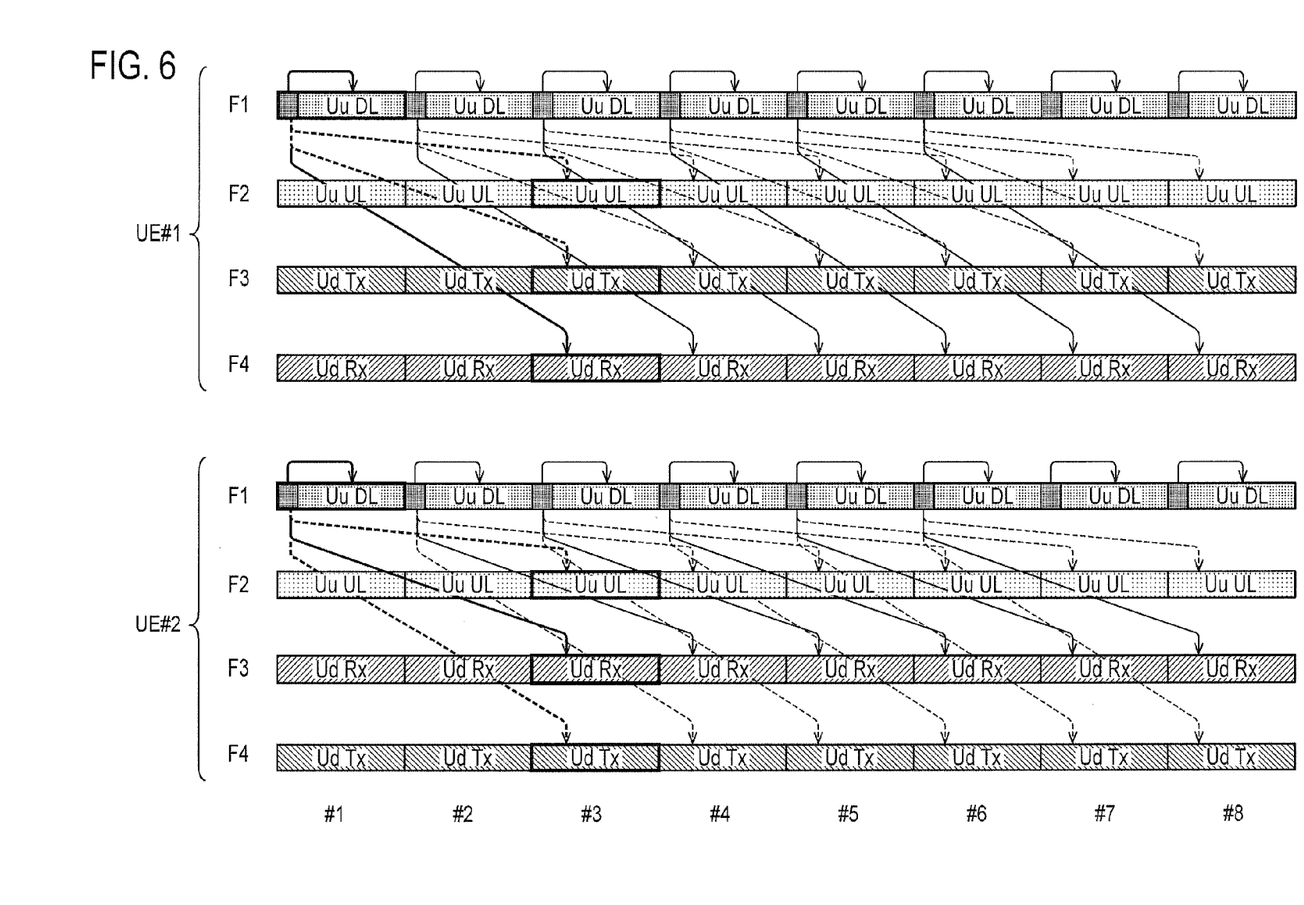
FIG. 6 is a view illustrating the transmission/reception timing in the mobile communication system according to the first embodiment of the present invention.

As illustrated in FIG. 6, in the case 4, the transmission/reception of the downlink through the Uu interface is configured to be performed at the frequency F1, the transmission/reception of the uplink through the Uu interface is configured to be performed at the frequency F2, the transmission/reception (UE#1→UE#2) through the Ud interface is configured to be performed at a frequency F3, and the transmission/reception (UE#2→UE#1) through the Ud interface is configured to be performed at a frequency F4.

That is, in the case 4, the multiplex of the transmission/reception (UE#1→UE#2) through the Ud interface and the transmission/reception (UE#2→UE#1) through the Ud interface is FDD (Frequency Divisional Duplexing).

In the case 4, the operation of the radio base station eNB is basically similar to that of the case 3. However, because the transmission/reception (UE#1→UE#2) through the Ud interface and the transmission/reception (UE#2→UE#1) through the Ud interface are performed at different frequencies, the transmission unit 12 needs not to transmit the "direction information".

In the case 4, it is necessary for the mobile station UE#1 to have the ability to perform the transmission through the Ud interface at the frequency F3 while performing the reception through the Ud interface at the frequency F4, and it is necessary for the mobile station UE#2 to have the ability to perform the transmission through the Ud interface at the frequency F4 while performing the reception through the Ud interface at the frequency F3.

However, desirably the frequency used in the transmission/reception through the Ud interface is not restricted by the combination of the mobile stations UE as much as possible, but desirably the Ud interface can be set between the mobile stations UE having the equal ability.

Accordingly, in the case 4, desirably the mobile station UE#1 and the mobile station UE#2 have the ability to perform the transmission/reception through the Ud interface at both the frequencies F3 and F4.

From the viewpoint of the Radio frequency (RF) ability, this is equivalent to the fact that the mobile station UE#1 and the mobile station UE#2 support the transmission/reception through the Ud interface at a plurality of frequencies (carriers) in the case 3.

In the case where the mobile station UE#1 and the mobile station UE#2 support the transmission/reception through the Ud interface at a plurality of frequencies (carriers), there are two options, namely, the TDD and the FDD as a method for multiplexing the transmission/reception (UE#1→UE#2) through the Ud interface and the transmission/reception (UE#2→UE#1) through the Ud interface.

For the TDD, the radio base station eNB provides the "direction information" to the PDCCH format to enable the flexible allocation according to a traffic amount in each of the transmission/reception (UE#1→UE#2) through the Ud interface and the transmission/reception (UE#2→UE#1) through the Ud interface.

On the other hand, for the FDD, the necessity to provide the "direction information" to the PDCCH format is eliminated.

In such cases, during the setting of the Ud interface, frequency (carrier) used in the transmission/reception (UE#1→UE#2) through the Ud interface or the transmission/reception (UE#2→UE#1) through the Ud interface is notified through the RRC signaling.

Accordingly, for example, which frequency (carrier) is used in the transmission/reception (UE#1→UE#2) through the Ud interface or the transmission/reception (UE#2→UE#1) through the Ud interface is determined by the "carrier index" included in the PDCCH.

For the TDD, in the case where the radio base station eNB previously assigns the time-division of the transmission/reception (UE#1→UE#2) through the Ud interface and the transmission/reception (UE#2→UE#1) through the Ud interface through the RRC signaling, the time-division can quasi-fixedly be changed although the dynamic flexibility is degraded.

In such cases, it is not necessary for the radio base station eNB to notify of the "direction information" in the PDCCH format, and the number of patterns of the "blind decode" performing PDCCH format can be decreased.

In all the cases above, the "direction information" is notified in the PDCCH format, the mobile station UE#1 and the mobile station UE#2 may previously be notified of a definition of the information through the RRC signaling. That is, the mapping of the "direction information" to the transmission/reception may previously be notified through the RRC signaling.

For example, in the case where the "direction information" is indicated by a one-bit information element on the PDCCH, the mobile station UE#1 may be notified that the "direction information=1" indicates the transmission while the "direction information=0" is the reception, and the mobile station UE#2 may be notified that the "direction information=0" indicates the transmission while the "direction information=1" is the reception.

In all the cases above, in the case where the mobile station UE#1 and the mobile station UE#2 are notified of the "direction information" through the RRC signaling while the "direction information" on the PDCCH is eliminated, the PDCCH to which the transmission/reception through the Ud interface is allocated may be restricted so as to indicate the one-way allocation after the "direction information" is set through the RRC signaling. In this case, the RRC signaling is used again when the direction of the transmission/reception is switched.

Alternatively, the "direction information" notified through the RRC signaling may be configured to be tied to a periodic time resource or frequency resource. In this case, the direction of the transmission/reception is determined according to the time and frequency resources allocated by the PDCCH.

The features of the embodiment may be expressed as follows.

A first feature of the present invention is that a mobile communication method for transmitting and receiving the data signal and the control signal through the Uu interface (radio base station interface) between the mobile station UE#1 (the first mobile station) and the mobile station UE#2 (the second mobile station) and the radio base station eNB, and for transmitting and receiving the data signal through the Ud interface (the inter-mobile station interface) between the mobile station UE#1 and the mobile station UE#2, the mobile communication method includes: a step A in which the radio base station eNB notifies the mobile station UE#1 and the mobile station UE#2 that the opportunity to transmit and receive the data signal through the Ud interface is allocated through the PDCCH (the physical downlink control channel) in which the X-RNTI (the common identification information) is used; and a step B in which the radio base station eNB transmits the "direction information (the transmission direction information)", for notifying of the direction in which the data signal should be transmitted in the opportunity, to the mobile station UE#1 and the mobile station UE#2.

A second feature of the present invention is that a radio base station eNB used in the mobile communication system configured to be able to transmit and receive the data signal and the control signal through the Uu interface between the mobile station UE#1 and the mobile station UE#2 and the radio base station eNB, and to transmit and receive the data signal through the Ud interface between the mobile station UE#1 and the mobile station UE#2, the radio base station eNB includes a transmission unit 12 configured to notify the mobile station UE#1 and the mobile station UE#2 that the opportunity to transmit and receive the data signal through the Ud interface is allocated through the PDCCH in which the X-RNTI is used, wherein the transmission unit 12 is configured to transmit the "direction information", for notifying of the direction in which the data signal should be transmitted in the opportunity, to the mobile station UE#1 and the mobile station UE#2.

In the second feature of the present invention, the transmission unit 12 may be configured to transmit the "direction information" through the PDCCH in which the X-RNTI is used.

In the second feature of the present invention, the transmission unit 12 may be configured to transmit the mapping of the transmission and reception of the "direction information", which is transmitted through the PDCCH, through the RRC signaling.

In the second feature of the present invention, the transmission unit 12 may be configured to transmit the "direction information" through the RRC signaling.

In the second feature of the present invention, the "direction information" may be tied to the periodic time resource and frequency resource.

In the second feature of the present invention, the transmission unit 12 may be configured to notify of the frequency, at which the data signal should be transmitted and received through the Ud interface, through the PDCCH in which the X-RNTI is used.

In the second feature of the present invention, the transmission unit 12 may be configured to notify of the frequency, at which the data signal should be transmitted and received through the Ud interface, through the RRC signaling.

In the second feature of the present invention, the transmission unit 12 may be configured to notify of the subframe, to which the data signal should be transmitted and received through the Ud interface, through the PDCCH in which the X-RNTI is used.

In the second feature of the present invention, the transmission unit 12 may be configured to transmit and receive the data signal and the control signal through the Uu interface through the RRC signaling, and to transmit the time-division information necessary to transmit and receive the data signal in the time-division manner through the Ud interface through the RRC signaling.

In the second feature of the present invention, the transmission unit 12 may be configured such that the PDCCH format, for notifying the opportunity to transmit and receive the data signal through the Uu interface is allocated, is different from the PDCCH format, for notifying the opportunity to transmit and receive the data signal through the Ud interface is allocated.

The operations of the radio base station eNB and the mobile stations UE#1 and UE#2 may be performed by hardware, a software module executed by a processor, or a combination thereof.

The software module may be provided in any type of storage medium such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, and a CD-ROM.

The storage medium is connected to the processor such that the processor can read and write the information in and from the storage medium. The storage medium may be integrated in the processor. The storage medium may be provided in an ASIC. The ASIC may be provided in the radio base station eNB or the mobile stations UE#1 and UE#2. The storage medium and the processor may be provided as a discrete component in the radio base station eNB or the mobile stations UE#1 and UE#.

Although the present invention is described above in detail using the embodiment, it is clear for those skilled in the art that the present invention is not limited to the embodiment. Various modifications and changes can be made without departing from the scope of the present invention. Accordingly, the description is illustrative only, but not restrictive.

This application is based on Japanese Patent Application No. 2011-111921 filed with the Japan Patent Office on May 18, 2011, the entire content of which is hereby incorporated by reference.

INDUSTRIAL APPLICABILITY

As described above, the present invention can provide the mobile communication method and the radio base station, which can properly adjust the transmission/reception timing of the data signal and the control signal through the Uu interface and the transmission/reception timing of the data signal through the Ud interface.

REFERENCE SIGN LIST

UE#1,UE#2 mobile station
eNB radio base station
11 allocation unit
12 transmission unit
13 reception unit

The invention claimed is:
1. A mobile communication method for transmitting and receiving a data signal and a control signal through a radio base station interface between a first mobile station and a second mobile station and a radio base station, and for transmitting and receiving a data signal through an inter-mobile station interface between the first mobile station and the second mobile station, the mobile communication method comprising:
using a first carrier employing a first frequency for downlink through the radio base station interface;

using a second carrier employing a second frequency for uplink through the radio base station interface;

using either one of the first carrier or the second carrier for transmitting and receiving the data signal through the inter-mobile station interface;

by the radio base station, notifying the first mobile station and the second mobile station that an opportunity to transmit and receive the data signal through the inter-mobile station interface is allocated through a physical downlink control channel using the first carrier in which common identification information is used;

by the radio base station, transmitting transmission direction information through RRC signaling, for notifying of a direction in which the data signal should be transmitted in the opportunity, to the first mobile station and the second mobile station; and by the radio base station, transmitting time division information necessary to transmit and receive the data signal and the control signal through the radio base station interface and transmit and receive the data signal through the inter-mobile station interface in a time division manner, through RRC signaling.

2. A radio base station that is used in a mobile communication system configured to be able to transmit and receive a data signal and a control signal through a radio base station interface between a first mobile station and a second mobile station and a radio base station, and to transmit and receive a data signal through an inter-awhile station interface between the first mobile station and the second mobile station, the radio base station comprising:

a transmission unit configured to transmit the data signal and the control signal to the first mobile station and a second mobile station through the radio base station interface, using a first carrier employing a first frequency; and a reception unit configured to receive the data signal and the control signal from the first mobile station and a second mobile station through the radio base station interface, using a second carrier employing a second frequency; wherein either one of the first carrier or the second carrier is used for transmitting and receiving the data signal through the inter-mobile station interface;

the transmission unit is configured to notify the first mobile station and the second mobile station that an opportunity to transmit and receive the data signal through the inter-mobile station interface is allocated through a physical downlink control channel using the first carrier in which common identification information is used;

the transmission unit is configured to transmit transmission direction information through RRC signaling, for notifying of a direction in which the data signal should be transmitted in the opportunity, to the first mobile station and the second mobile station; and the transmission unit is configured to transmit time division information to the first mobile station and a second mobile station, necessary to transmit and receive the data signal and the control signal through the radio base station interface, and transmit and receive the data signal through the inter-mobile station interface in a time division manner, through RRC signaling.

3. The radio base station according to claim 2, wherein the transmission direction information is tied to a periodic time resource and frequency resource.

4. The radio base station according to claim 2, wherein the transmission unit is Configured to notify of a frequency, at which the data signal should be transmitted and received through the inter-mobile station interface, through the physical downlink control channel.

5. The radio base station according to claim 2, wherein the transmission unit is configured to notify of a frequency, at which the data signal should be transmitted and received through the inter-mobile station interface, through RRC signaling.

6. The radio base station according to claim 2, wherein the transmission unit is configured to notify of a subframe, to which the data signal should be transmitted and received through the inter-mobile station interface, through the physical downlink control channel.

7. The radio base station according to claim 2, wherein the transmission unit is configured to transmit and receive the data signal and the control signal through the radio base station interface through RRC signaling, and to transmit time-division information necessary to transmit and receive the data signal in a time division manner through the inter-mobile station interface through the RRC signaling.

8. The radio base station according to claim 2, wherein the transmission unit is configured such that a format of the physical downlink control channel, for notifying that the opportunity to transmit and receive the data signal through the radio base station interface is allocated, is different from a format of physical downlink control channel, for notifying that the opportunity to transmit and receive the data signal through the inter-mobile station interface is allocated.

* * * * *